(12) United States Patent
Bilgen et al.

(10) Patent No.: US 12,602,791 B2

(45) Date of Patent: Apr. 14, 2026

(54) VISUAL SEGMENTATION OF DOCUMENTS CONTAINED IN FILES

(71) Applicant: Base64.ai, Inc., New York, NY (US)

(72) Inventors: Ozan Eren Bilgen, New York, NY (US); Alperen Sahin, Istanbul (TR); Begum Yalcin, Amsterdam (NL); Can Korkut, Ankara (TR); Ihsan Soydemir, Munich (DE)

(73) Assignee: Base64.ai, Inc., New York, NY (US)

( * ) Notice: Subject to any disclaimer, the term of this patent is extended or adjusted under 35 U.S.C. 154(b) by 282 days.

(21) Appl. No.: 18/342,612

(22) Filed: Jun. 27, 2023

(65) Prior Publication Data

US 2024/0362792 A1     Oct. 31, 2024

Related U.S. Application Data

(63) Continuation-in-part of application No. 18/307,682, filed on Apr. 26, 2023.

(51) Int. Cl.
| | |
|---|---|
| G06F 40/106 | (2020.01) |
| G06F 16/33 | (2025.01) |
| G06F 40/103 | (2020.01) |
| G06T 7/12 | (2017.01) |
| G06T 7/136 | (2017.01) |

(52) U.S. Cl.
CPC ............ G06T 7/136 (2017.01); G06F 40/103 (2020.01); G06T 7/12 (2017.01); *G06T 2207/20081* (2013.01); *G06T 2207/20132* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 11,715,310 | B1 | 8/2023 | Sammons et al. |
| 2017/0372460 | A1* | 12/2017 | Zagaynov ................ G06T 3/06 |
| 2019/0278986 | A1 | 9/2019 | Nepomniachtchi et al. |
| 2019/0294661 | A1* | 9/2019 | Sarkar ................... G06V 20/70 |
| 2020/0184210 | A1 | 6/2020 | Malabarba |
| 2021/0157861 | A1 | 5/2021 | Katzman et al. |
| 2021/0326630 | A1 | 10/2021 | Chen et al. |
| 2021/0334529 | A1 | 10/2021 | Zakharov et al. |
| 2022/0309813 | A1 | 9/2022 | Melchy et al. |

(Continued)

*Primary Examiner* — Andrew H Lam

(74) *Attorney, Agent, or Firm* — Lynch LLP; Sean Lynch

(57) ABSTRACT

Systems and methods of the inventive subject matter are directed to artificial intelligence systems that are configured to receive an uploaded file from a user, where that upload contains images of one or more documents. Documents can be, e.g., receipts, identification cards, and so on. Once received, the system converts the image to a tensor to facilitate identifying mask images. The AI system then converts any identified mask images to grayscale before converting the image to black and white. White spaces are identified, and contours are identified that surround the white spaces. Next, white spaces with areas below a threshold size are discarded and white spaces with areas above that threshold have their contours stored. The AI system finds a minimum bounding rectangle for each contour and then crops the image around each white space accordingly. In this way, documents can be found within an image file and segmented to later processing.

14 Claims, 3 Drawing Sheets

(56)     References Cited

U.S. PATENT DOCUMENTS

| | | |
|---|---|---|
| 2022/0414370 A1 | 12/2022 | Pribble et al. |
| 2023/0090313 A1* | 3/2023 | Mittal ........................ G06T 5/77 |
| | | 382/260 |
| 2023/0351790 A1 | 11/2023 | Zhu et al. |
| 2024/0220727 A1 | 7/2024 | Yuan et al. |
| 2024/0221411 A1 | 7/2024 | Wells et al. |
| 2024/0248896 A1 | 7/2024 | Boskovic et al. |

\* cited by examiner

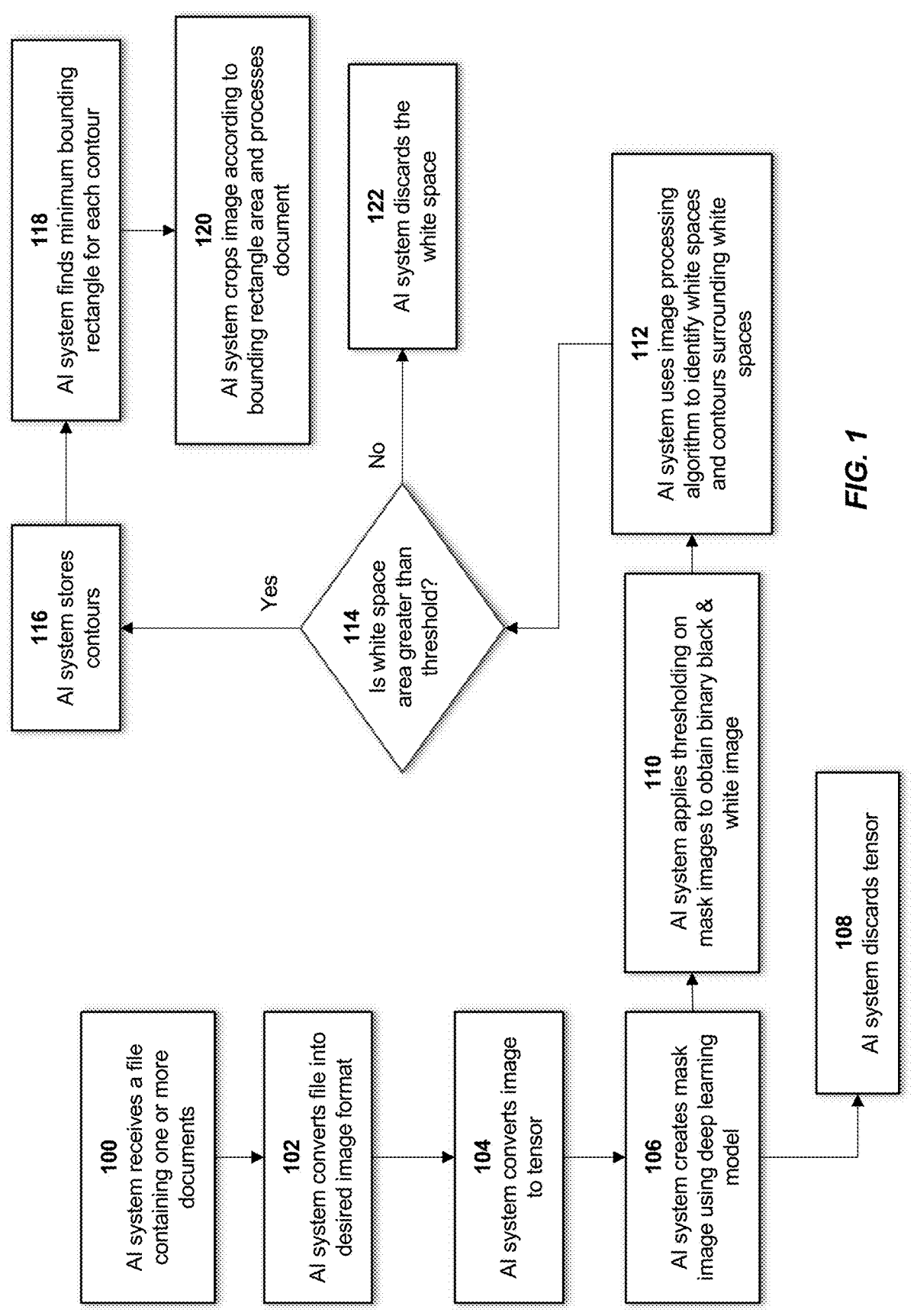

118
AI system finds minimum bounding rectangle for each contour

120
AI system crops image according to bounding rectangle area and processes document

122
AI system discards the white space

116
AI system stores contours

114
Is white space area greater than threshold?

Yes

No

112
AI system uses image processing algorithm to identify white spaces and contours surrounding white spaces

110
AI system applies thresholding on mask images to obtain binary black & white image

108
AI system discards tensor

100
AI system receives a file containing one or more documents

102
AI system converts file into desired image format

104
AI system converts image to tensor

106
AI system creates mask image using deep learning model

*FIG. 1*

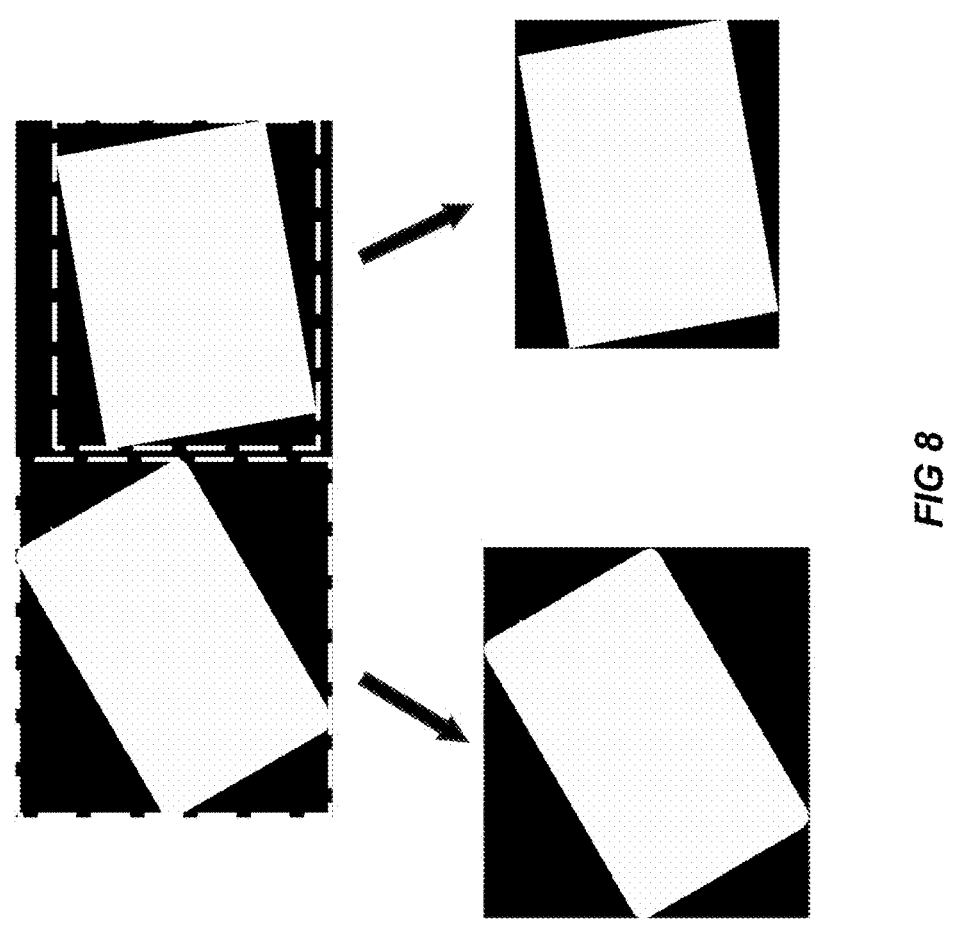
FIG 8
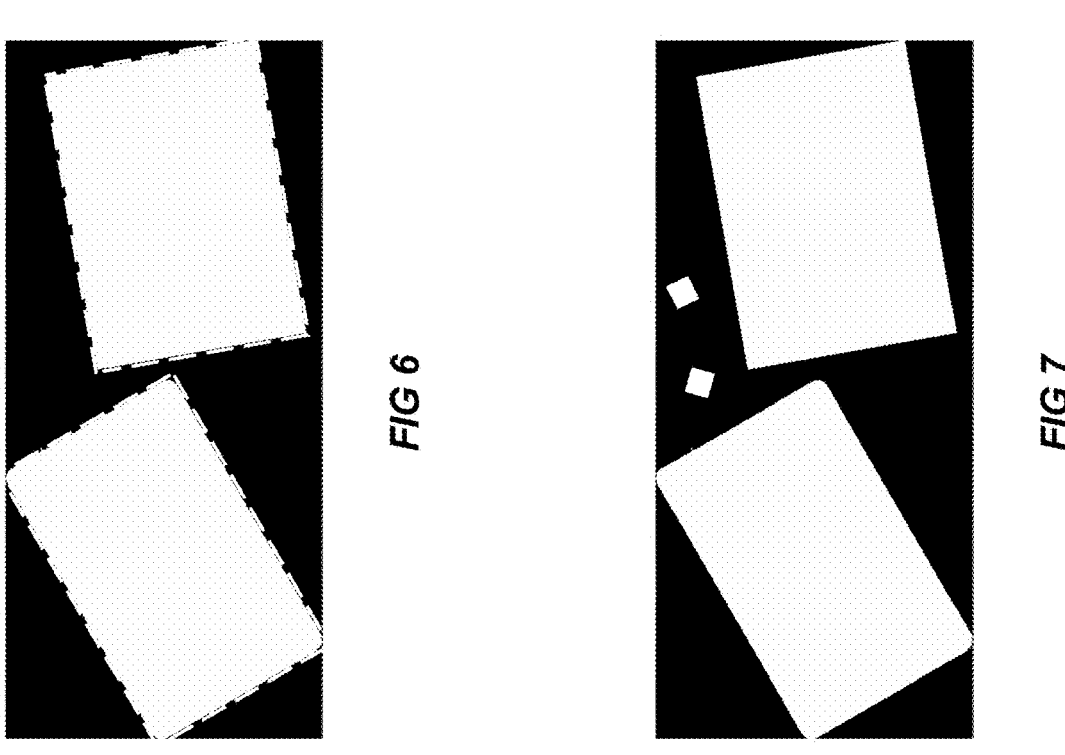
FIG 6
FIG 7

VISUAL SEGMENTATION OF DOCUMENTS CONTAINED IN FILES

This application is a continuation-in-part and claims priority to Ser. No. 18/307,682, filed Apr. 26, 2023. All extrinsic materials identified in this application are incorporated by reference in their entirety.

FIELD OF THE INVENTION

The field of the invention is document segmentation using artificial intelligence systems.

BACKGROUND

The background description includes information that may be useful in understanding the present invention. It is not an admission that any of the information provided in this application is prior art or relevant to the presently claimed invention, or that any publication specifically or implicitly referenced is prior art.

Image segmentation is an important machine learning technique that allows us to divide an image into its constituent parts, or segments. This can be used in a variety of practical applications such as medical image analysis, autonomous vehicles, and biomedical recognition. Image segmentation is a complex problem, and there are a variety of different techniques that can be used. The best technique to use will depend on the specific application.

With constant improvement of artificial intelligence, new needs are constantly arising. Many businesses need to be able to quickly receive and process documents that are uploaded in image files. This need can arise, for example, when a business needs to be able to quickly receive and verify a user's age. Users can be prompted to upload a picture of an identification document. In some cases, a user may have to upload multiple documents, such as two forms of identification.

In these situations, which often implicate an onboarding process for a new service, time is of the essence. If a user is not verified promptly, they may lose interest in the service. Thus, there exists a need for ways to quickly and efficiently discern where those documents exist in an image and then segment those images so that the documents contained therein can be easily processed. Without some way to segment multiple documents that appear in an image, it would be much more difficult to process multiple documents contained in a single image.

Thus, there is still a need in the art for systems and methods directed to document segmentation for images that contain multiple documents.

SUMMARY OF THE INVENTION

The present invention is directed to apparatuses, systems, and methods that use artificial intelligence to facilitate document segmentation. Document segmentation can be useful to isolate multiple documents that are included in, e.g., a single image so that each document can be processed individually.

In one aspect of the inventive subject matter, a method of document segmentation using artificial intelligence (AI) includes the steps of: receiving, by an AI system, a file comprising an image of a first document and a second document; converting, by the AI system, the file into a tensor; applying a deep learning model to the tensor to create a mask image from the tensor, where the deep learning model has been trained using a training set of images having ground truth masks and where each image in the training set comprises at least two documents; converting the mask image to a grayscale image; applying thresholding to the grayscale image to create a black and white image; applying image processing to the black and white image to identify a first white space and a second white space along with a first contour surrounding the first white space and a second contour surrounding the second white space; where the first contour comprises a first list of vectors that form a first closed shape around the first white space, and wherein the second contour comprises a second list of vectors that form a second closed shape around the second white space; where the first white space has a first area the second white space has a second area; where the black and white image has a total area; comparing the first area to the total area to get a first ratio and comparing the second area to the total area to get a second ratio; comparing the first ratio and the second ratio to a threshold value; upon determining the first ratio exceeds the threshold value, recording the first contour; upon determining the second ratio exceeds the threshold value, recording the second contour; identifying a first minimum bounding rectangle that surrounds the first contour and cropping the image according to the first minimum bounding rectangle to create a first processable image; and identifying a second minimum bounding rectangle that surrounds the second contour and cropping the image according to the second minimum bounding rectangle to create a second processable image.

In some embodiments, the method further comprises the step of converting the file from its original format to portable network graphics format. The step of applying thresholding can use Otsu thresholding to produce a black and white image. In some embodiments, the step of recording the first contour comprises appending the first contour to a contour list, and the step of recording the second contour comprises appending the second contour to the contour list.

In another aspect of the inventive subject matter, a method of document segmentation using artificial intelligence (AI) includes the steps of: receiving, by an AI system, a file comprising an image of a document; applying a deep learning model to the file to create a mask image from the file, where the deep learning model has been trained using a training set of images having ground truth masks and where each image in the training set comprises at least two documents; converting the mask image to a grayscale image; applying thresholding to the grayscale image to create a black and white image; applying image processing to the black and white image to identify a white space and a contour surrounding the white space, where the white space has an area and the black and white image has a total area; comparing the area to the total area to get a ratio; comparing the ratio to a threshold value; upon determining the ratio exceeds the threshold value, recording the contour; and identifying a minimum bounding rectangle that surrounds the contour and cropping the image according to the minimum bounding rectangle to create a processable image.

In some embodiments, the method further includes the step of converting the file from its original format to portable network graphics format. The method can also include the step of converting the image to tensor. The step of applying thresholding can use Otsu thresholding to create a black and white image. In some embodiments, the step of recording the contour comprises appending the contour to a contour list. A contour can include a list of vectors that form a closed shape around the white space.

In another aspect of the inventive subject matter, a method of document segmentation using artificial intelligence (AI) includes the steps of: receiving, by an AI system, a file comprising an image of a first document and a second document; applying a deep learning model to the image to facilitate converting the image into a black and white image; identifying, in the black and white image, a first white space corresponding to the first document and a second white space corresponding to the second document; comparing a first white space to the black and white image to create a first ratio and comparing the second white space to the black and white image to create a second ratio; based on the first ratio, cropping the image to surround the first document; and based on the second ratio, cropping the image to surround the second document.

In some embodiments, the method also includes the step of converting the file from its original format to portable network graphics format. The step of applying thresholding can use Otsu thresholding to create a black and white image. In some embodiments, the deep learning model has been trained using a training set of images having ground truth masks and wherein each image in the training set comprises at least two documents.

One should appreciate that the disclosed subject matter provides many advantageous technical effects including the ability to receive an image file having multiple documents and to then segment each document out for processing.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a flowchart showing how an AI system of the inventive subject matter can carry out document segmentation.

FIG. 6 shows the image of FIG. 5 with image contours surrounding white spaces.

FIG. 7 shows an example of an image having small white spaces that will ultimately be discarded.

FIG. 8 shows how two white spaces can be bounded and segmented.

DETAILED DESCRIPTION

Figure 4:
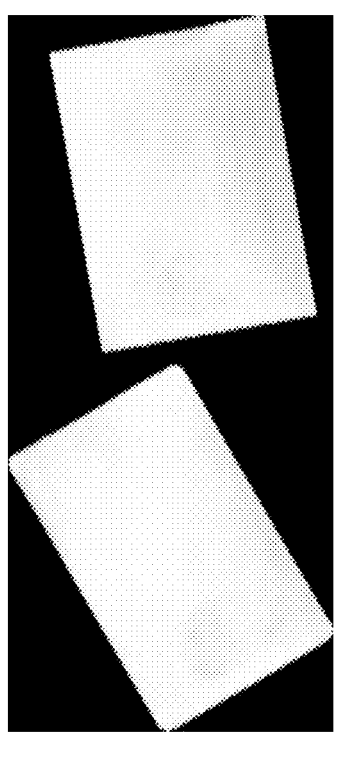
FIG. 4 shows the image of FIG. 3 after it has been converted to black and white.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing ranges used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

FIG. 1 is a flow chart describing how an AI system of the inventive subject matter can function. AI systems described in this application use artificial intelligence to identify the presence of documents contained in uploaded files. Uploaded files can feature a variety of documents, standardized and otherwise, like a driver's licenses, identification cards, forms, receipts, invoices, certificates, and so on. In this application, references to the AI system should be understood as referring to software running on a platform server, which can be configured as one or more servers (e.g., a cloud platform). Thus, when reference is made to a platform server, it should likewise be understood as being part of, or cooperating with, the AI system operating thereon. The AI system can be, e.g., part of a backend of a website or software application. In some embodiments, the AI system can be accessed by API call and can be made accessible from any website or software application.

In step 100, the AI system receives a file containing one or more documents. Files uploaded to the AI system can include images in any image format including PNG, JPG, GIF, TIFF, WEBP, RAW, EPS, and so on, including proprietary image formats like Apple's HEIC. In addition to image files, the AI system can also receive documents uploaded in a variety of document-based formats. For example, the AI system can receive file types including: Microsoft Office formats including DOC, DOCX, XLS, XLSX, PPT, PPTX; Open Office formats including ODS, ODT, ODP; PDF-both digital and image-only files are supported, files can be single or multi-page, and files can contain multiple document types (e.g., 3 ID pages plus 1 invoice); ZIP directories containing any supported file format; email message files (e.g., MSG) including any files or documents contained in or attached to up uploaded email or emails. It should be understood that the list of file types above is not exhaustive and should instead be considered demonstrative of variety of types of files an AI system of the inventive subject matter can receive.

Figure 2:
FIG. 2 shows an example of an image uploaded by a user to an AI system.

For example, a user can take a picture of their driver's license and then upload that picture to a platform server running the AI system. FIG. 2, for example, shows an example of a filed uploaded that contains two images of identification cards (ordinarily, this image would be in color). Two cards are included in the same file. The outer edges of the file are indicated by the outline around the identification cards. The first identification card is a New York State learner's permit, and the second identification card is a Ukrainian passport card. In step 102, the AI system converts an uploaded file to a desired filetype (e.g., a more useful format for image processing). An example of a useful format for image file uploads is the Portable Network Graphics format (*.PNG). PNG is a raster-graphics file format that supports lossless data compression. PNG was developed as an improved, non-patented replacement for Graphics Interchange Format. If the file received is already in a desired format, then step 102 involves checking whether converting to a different format is necessary and, if not, then no action is taken.

There are a few benefits to using PNG files for AI and machine vision. PNG files are a lossless image format, which means that they do not lose any quality when they are compressed or decompressed. This makes them a good choice for storing images for use with AI and machine vision, which work best with images that are accurate and precise. A lossless format ensures an AI or machine vision system is able to detect issues with the content of an image instead of issues that can arise due to compression.

PNG is not the only format that AI systems of the inventive subject matter can convert files into. For example, in some embodiments, the AI system can convert an uploaded file from its original format to another suitable image format that is selected based on a variety of factors including expected file degradation resulting from compres sion balanced against the benefits of storing a compressed image file. Suitable image files can include any of the image files mentioned above.

Figure 3:
FIG. 3 shows how the image of FIG. 2 changes as it is converted to grayscale.

In step 104, the AI system converts the image file, which is now in a more desirable format such as PNG, into a tensor. This step corresponds with FIG. 3, which shows the image as converted from its original format into a grayscale tensor. Thus, when the image is converted into a tensor, it can also be converted to grayscale. Grayscale conversion is beneficial because it downgrades a three-channel image to a one-channel image. This is why we use it without a visual difference in step 110. In computer science, tensors are used to represent and manipulate data, such as images and videos. A tensor is, essentially, a multidimensional data structure. For example, a scalar is a tensor of rank 0, a vector is a tensor of rank 1, a matrix is a tensor of rank 2, and a higher-order tensor is a tensor of rank greater than 2. Tensors are a powerful tool for representing and manipulating data, and they can be used in a wide variety of fields, including physics, engineering, and computer science.

In embodiments of the inventive subject matter, converting an image to a tensor is a makes information in an image easily usable in the context of machine learning and data manipulation. Image files (such as PNG, JPG, or the like) can be stored in three- or four-dimensional arrays, depending on the original format of the image, though tensors—as mentioned above—are capable of storing data in any number of dimensions greater than four. In deep learning, three- and four-dimensional data structures are generally insufficient to hold all the data that such systems manipulate. Thus, images should be converted into tensors before making any kind of machine-learning based predictions or conclusions. For example, embodiments of the inventive subject matter can use a deep learning model before conducting a black-and-white transformation (as described in step 110, below), which gives rise to a need for an image to be converted to a tensor.

Converting images to tensors can be beneficial for several reasons. One reason why images are converted to tensors in step 104 before conducting a black-to-white transformation in step 110, for example, is that an uploaded image can be any size, i.e., 512×1024×3, 900×256×3, 1024×1024×3, etc. (where the numbers indicate width, height, and RGB value), but some deep learning models may be configured to operate most efficiently with fixed-size tensors (e.g., 320×320×3). Thus, an image can be converted to a tensor (and, in some cases, resized) to ensure a deep learning model of an AI system is able to process the image efficiently. In some embodiments, no resizing is needed.

Another reason why converting an image to a tensor can be beneficial is that tensors are specifically designed for parallel processing on one or more GPUs. Deep learning models use a lot of data during training, and tensors can dramatically improve computation efficiency. For example, an image can have three channels, usually RGB (red, green, blue). After conversion to a tensor, each channel is represented in a separate dimension, which facilitates independent processing and analysis of the image's color components.

In step 106, the AI system creates a mask image from an uploaded file by using a deep learning model, as shown in FIG. 4. To create image masks using deep learning, an AI system of the inventive subject matter must be trained. First, a training set of images must be collected having with ground truth masks. The term "ground truth" indicates that something is known to be real or true, so in the case of a mask, the images collected for the training set have masks that are known. This training set will be used to train the deep learning model. The images should be of high quality and have clear boundaries between the objects and the background. The ground truth masks should be accurate and ideally pixel-level. The features of the documents present in the image are faint in FIG. 4, but they still exist, thus giving rise to subsequent steps that convert the image into a white spaces image (e.g., an image having white spaces and black spaces as shown in FIG. 5).

Next, a deep learning model must be selected for image segmentation. There are many different deep learning models that can be used for image segmentation. Some popular models include Mask R-CNN, U-Net, and DeepLabv3+. Once a deep learning model is selected, the deep learning model must be trained. The deep learning model can be trained on the training set of images having ground truth masks. Once training is complete, the deep learning model can be used to find image masks, and, according to step 106, the mask images are identified from an image tensor. After creating mask images, the AI system in step 108 discards the tensor.

Figure 5:
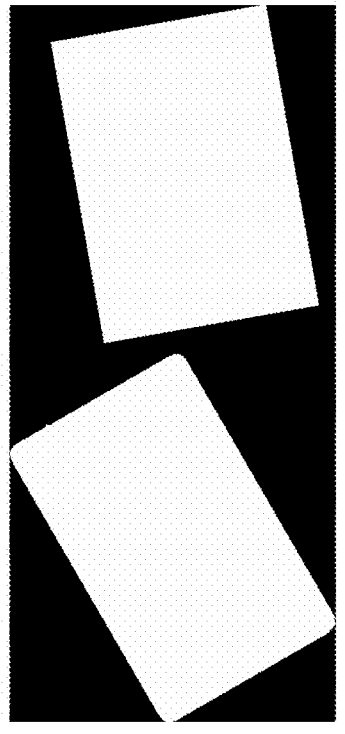
FIG. 5 shows the image of FIG. 4 after it has been subject to thresholding.

In step 110, the AI system applies a deep learning model to obtain a binary black and white image, as shown in FIG. 5. In some embodiments, the image, which is stored as a tensor, is already in grayscale, though and thus this step would not require conversion to grayscale in addition to applying a deep learning model.

Different types of image thresholding can be applied to create the image as it appears in FIG. 5. For example, Otsu thresholding (e.g., thresholding accomplished using Otsu's method) can be implemented. Otsu thresholding is a method for image thresholding that is used to convert a grayscale image into a binary image. The goal of thresholding is to separate the image into two classes: foreground and background. The foreground pixels are usually the objects of interest in the image, while the background pixels are the irrelevant pixels.

Otsu thresholding works by finding the threshold value that minimizes the intra-class variance. The intra-class variance is a measure of how spread out the pixels in a class are. The lower the intra-class variance, the more uniform the pixels in a class are. Otsu thresholding works by iterating through all possible threshold values and calculating the intra-class variance for each threshold value. The threshold value that minimizes the intra-class variance is the optimal threshold value. Otsu thresholding is, generally, simple and easy to implement, it is effective in most cases, it is fast and efficient. An example result of step 110 is a black and white image like the one shown in FIG. 5. By applying thresholding to return this result, the AI system can then more easily identify white spaces in the image.

In step 112, the AI system uses an image processing algorithm to identify white spaces and contours surrounding white spaces in the black and white image created in step 110. FIG. 5 shows an example of two white spaces that follow from using thresholding to create the black and white image. White space can be identified in a variety of ways. One way to identify white space is by brute force. An algorithm would simply checks each pixel in the image to see if it is white. If it is, it is added to a list of white pixels. This algorithm is simple to implement, but it is not very efficient. Another way is via region growing. A region growing algorithm would start with a seed pixel and then grows a region of white pixels by adding neighboring white pixels to the region. This algorithm is more efficient than a brute force algorithm, and it is less sensitive to noise. Other algorithms can be implemented, as needed.

Next, once the white space is algorithmically identified, as shown in FIG. 5, the AI system can identify contours surrounding white spaces. A contour around a white space is shown in FIG. 6, where the contours for each document present in the image are represented by white dotted lines surrounding each area of white space. Each contour is made up of a list of vectors that form a closed shape around a white space, where the white space corresponds to the document in a mask image. There can be multiple contours if multiple white spaces are found.

With this step completed, the AI system then, in step 114, checks whether the area of the white space exceeds a threshold (e.g., as compared to a total image size). This step helps to eliminate white spaces that do not correspond to a document. To compare the area of a white space to the total area of an image, contours created around white spaces in the previous step are used to determine white space area. If the area of a white space exceeds some percent of the total image area, then it is kept. If the area of a white space fall below that threshold, then in step 122 the AI system discards the white space. FIG. 7 shows an example image where two small white spaces are identified in addition to two large white spaces. Because the two small white spaces fall below a 5% threshold (meaning the area of each small white space is less than 5% of the total area of the image), those white spaces are discarded and will not be considered in later steps.

One threshold that has been experimentally established to yield high quality results is 5%. In other words, if the area of a white space is less than 5% of a total image area, then that white space is discarded, but if the area of a white space is greater than 5% of the total image area, then that white space is kept, as it is likely to indicate the white space is associated with a document in an image. Other thresholds can be implemented, depending on different factors such as anticipated document and image areas. In some embodiments, the threshold is 2% and can range up to 30%. In some embodiments, the threshold can be adjusted automatically based on the white spaces identified in an uploaded document to ensure that at least one white space is kept.

For white spaces that have an area exceeding the threshold, then in step 116, the AI system stores the identified contours to a contour list. This can occur by, e.g., the AI system appending each contour to the contour list. Next, in step 118, the AI system finds a minimum bounding rectangle that surrounds each contour. In general, a minimum contour area is calculated according to the smallest rectangle that can be drawn around a contour, where each side of the bounding rectangle is parallel to the edges of the original image. The top portion of FIG. 8 shows two white spaces that are bound by minimally-sized rectangles, which are represented by dotted lines, and the bottom portion of FIG. 8 shows how the image can be cropped according to those minimum bounding rectangles to isolate each of the documents present in the image. As mentioned below, any image discussed in this application can be subject to cropping and segmentation (e.g., the originally updated image or any of the modified images that follow).

In step 120, the AI system thus crops the image according to the bounding rectangle that is found in step 118. Once cropped, the AI system can processes the document or documents present in the file. If there are multiple documents present in an image, the AI system can crop the image into two separate images, each containing a document. An example of this is shown in FIG. 8 where two white spaces present in a file are cropped according to their corresponding minimum bound rectangles. The image that is cropped in this step can be, e.g., the originally uploaded image, the image file after it has been converted into a different image format, the image stored as a tensor, or any other version of the image created during any of the steps described in this application. By cropping the image according to a bounding rectangle, the AI system will have segmented off a document present in the image, which can then be processed individually (e.g., as shown in FIG. 8). In cases where multiple documents are present in an image, the step of cropping can be conducted for each of the bounded rectangles that the AI system creates around the contours. This can result in multiple documents that are segmented from each other in separate images, allowing each individual image to be processed separately. Minimum bounded rectangles of the inventive subject matter can be oriented the same as the document itself (e.g., the sides of a minimum bounding rectangle are parallel with the sides of the image overall), even when the contour it surrounds is otherwise askew.

In processing each segmented document, the AI system can conduct document classification, identification, and data extraction as described in U.S. patent application Ser. No. 18/307,682, which is incorporated by reference in its entirety into this application. Thus, systems and methods of the inventive subject matter are capable of receiving an uploaded file containing one or more documents.

Thus, specific systems and methods directed to segmentation of documents present in an uploaded file have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of document segmentation using artificial intelligence (AI) comprising the steps of:

receiving, by an AI system, a file comprising an image of a first document and a second document;

converting, by the AI system, the file into a tensor;

applying a deep learning model to the tensor to create a mask image from the tensor, wherein the deep learning model has been trained using a training set of images having ground truth masks and wherein each image in the training set comprises at least two documents;

converting the mask image to a grayscale image;

applying thresholding to the grayscale image to create a black and white image;

applying image processing to the black and white image to identify a first white space and a second white space along with a first contour surrounding the first white space and a second contour surrounding the second white space;

wherein the first contour comprises a first list of vectors that form a first closed shape around the first white space, and wherein the second contour comprises a second list of vectors that form a second closed shape around the second white space;

wherein the first white space has a first area the second white space has a second area;

wherein the black and white image has a total area;

comparing the first area to the total area to get a first ratio and comparing the second area to the total area to get a second ratio;

comparing the first ratio and the second ratio to a threshold value;

upon determining the first ratio exceeds the threshold value, recording the first contour;

upon determining the second ratio exceeds the threshold value, recording the second contour;

identifying a first minimum bounding rectangle that surrounds the first contour and cropping the image according to the first minimum bounding rectangle to create a first processable image; and identifying a second minimum bounding rectangle that surrounds the second contour and cropping the image according to the second minimum bounding rectangle to create a second processable image.

2. The method of claim 1, further comprising the step of converting the file from its original format to portable network graphics format.

3. The method of claim 1, wherein the step of applying thresholding comprises using Otsu thresholding.

4. The method of claim 1, wherein the step of recording the first contour comprises appending the first contour to a contour list, and wherein the step of recording the second contour comprises appending the second contour to the contour list.

5. A method of document segmentation using artificial intelligence (AI) comprising the steps of:

receiving, by an AI system, a file comprising an image of a document;

applying a deep learning model to the file to create a mask image from the file, wherein the deep learning model has been trained using a training set of images having ground truth masks and wherein each image in the training set comprises at least two documents;

converting the mask image to a grayscale image;

applying thresholding to the grayscale image to create a black and white image;

applying image processing to the black and white image to identify a white space and a contour surrounding the white space;

wherein the white space has an area and the black and white image has a total area;

comparing the area to the total area to get a ratio;

comparing the ratio to a threshold value;

upon determining the ratio exceeds the threshold value, recording the contour; and identifying a minimum bounding rectangle that surrounds the contour and cropping the image according to the minimum bounding rectangle to create a processable image.

6. The method of claim 5, further comprising the step of converting the file from its original format to portable network graphics format.

7. The method of claim 5, further comprising the step of converting the image to tensor before the step of applying a deep learning model.

8. The method of claim 5, wherein the step of applying thresholding comprises using Otsu thresholding.

9. The method of claim 5, wherein the step of recording the contour comprises appending the contour to a contour list.

10. The method of claim 5, wherein the contour comprises a list of vectors that form a closed shape around the white space.

11. A method of document segmentation using artificial intelligence (AI) comprising the steps of:

receiving, by an AI system, a file comprising an image of a first document and a second document;

applying a deep learning model to the image to facilitate converting the image into a black and white image;

identifying, in the black and white image, a first white space corresponding to the first document and a second white space corresponding to the second document;

comparing a first white space to the black and white image to create a first ratio and comparing the second white space to the black and white image to create a second ratio;

based on the first ratio, cropping the image to surround the first document; and based on the second ratio, cropping the image to surround the second document.

12. The method of claim 11, further comprising the step of converting the file from its original format to portable network graphics format.

13. The method of claim 11, wherein the step of applying thresholding comprises using Otsu thresholding.

14. The method of claim 11, wherein the deep learning model has been trained using a training set of images having ground truth masks and wherein each image in the training set comprises at least two documents.

* * * * *